April 23, 1929. W. A. HEFLER 1,710,164

PACKAGE

Filed July 23, 1927

Inventor:
William A. Hefler.
by Emery, Booth, Janney & Varney
Attys.

Patented Apr. 23, 1929.

1,710,164

UNITED STATES PATENT OFFICE.

WILLIAM A. HEFLER, OF BOSTON, MASSACHUSETTS, ASSIGNOR TO MAYNARD HEFLER ENGINEERING COMPANY, OF BOSTON, MASSACHUSETTS, A CORPORATION OF MASSACHUSETTS.

PACKAGE.

Application filed July 23, 1927. Serial No. 207,914.

My invention relates to packages and particularly, though not exclusively, to one containing cake, or the like and a container for a filler, such as jam, to be applied to the cake.

The invention will be best understood from the following description when read in the light of the accompanying drawing of an illustrative embodiment of the invention, while the scope of the invention will be more particularly pointed out in the appended claims.

In the drawings:—

Figure 1:
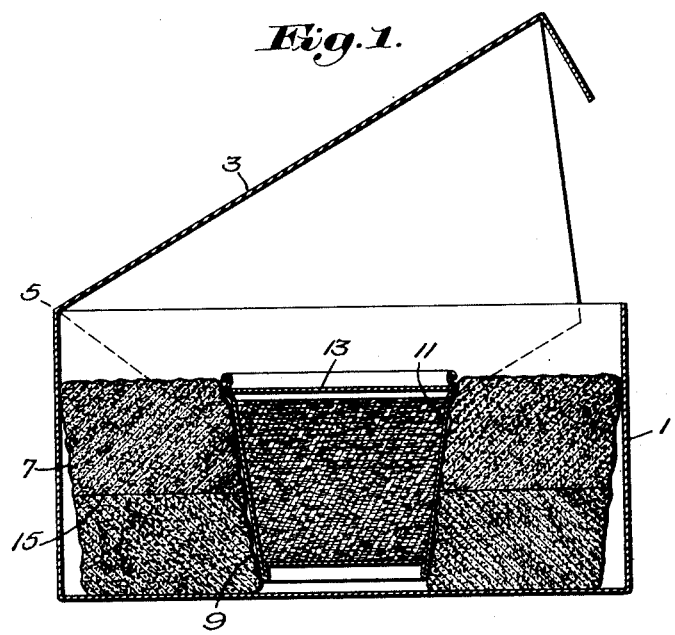
Figure 1 is a vertical section of a package according to the invention.
Figure 2:
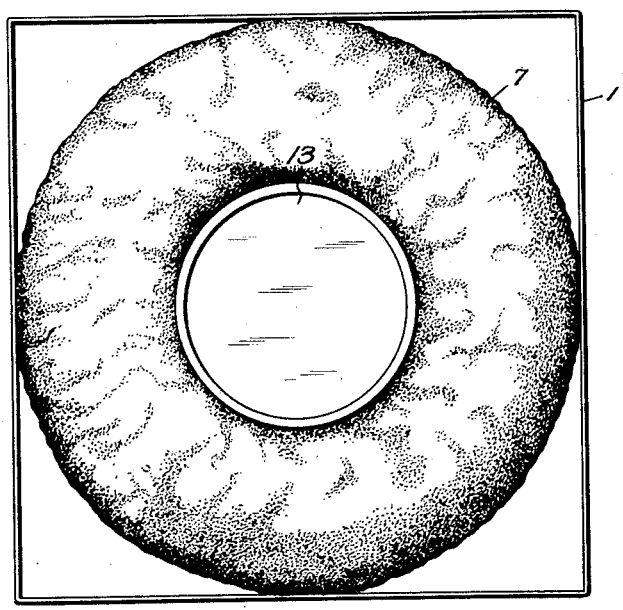
Fig. 2 is a plan according to Figure 1 with the cover of the box omitted.

Referring to the drawings, a box 1 of suitable material, such as cardboard, may be provided with a cover 3 hinged to the body of the box at 5 so that upon raising the cover (which in Figure 1 is shown partially raised) the contents of the box may be removed. As shown, the box contains a flat substantially cylindrical loaf 7 of baked edible farinaceous material, such as cake, the loaf preferably being of such diameter that it fits the interior of the box at four points, and being provided with a perforation 9 which preferably is tapered and has its largest diameter adjacent the cover 3. Received in the perforation and fitting the walls thereof is shown a frustoconical container 11 of suitable material, such as waterproofed paper, this container herein having a removable cover 13. Conveniently, the cake may be split in a plane transverse to the axis of the loaf, this split being represented by the line 15 (Figure 1), while the container may be filled with suitable material, such as jam, to be spread on one of those surfaces of the loaf which are presented by the split, so as to make what is commonly termed a "layer cake".

It will be observed that by making the perforation 9 tapered and causing the container 11 to fit the walls of said perforation the loaf may be removed through the top opening of the box without the container falling through the perforation. It will also be observed that the container serves to hold together in alignment the two halves of the loaf at opposite sides of the split.

Heretofore in the commercial cake industry it has been necessary to make cake having applied thereto jam or other readily absorbed material of such texture as will prevent such absorption, this resulting in a relatively tough and unpalatable product as compared with the domestic product. By shipping the materials for a "layer cake", for example, with the jam or other filler in a separate container, it is possible to furnish a superior cake, because the necessity of making the cake unabsorbent in respect to the filler is eliminated.

Although I have described, for purposes of illustration, a specific embodiment of the invention, it will be understood that wide deviations may be made therefrom without departing from the spirit of the invention.

Claims—

1. A package having, in combination, a box, a relatively soft absorbent form-retaining edible baked article in said box, said article having a perforation, and a container containing edible material capable of being absorbed into said article when applied thereto, said container received in said perforation.

2. A package having, in combination, a box, a relatively soft absorbent form-retaining edible baked article in said box, said article having a perforation, and a container containing edible material capable of being absorbed into said artictle when applied thereto, said container received in said perforation and both being tapered and the former fitting the walls of the latter.

3. A package having, in combination, a box, a relatively soft absorbent form-retaining edible baked article in said box, said article being split and having a perforation intersecting said split, a container containing edible material capable of being absorbed into said article when applied thereto, said container being positioned in said perforation.

4. A package having, in combination, a box having a cover, a relatively soft absorbent form-retaining edible baked article in said box, said article having a perforation, and a container containing edible material capable of being absorbed into said article when applied thereto, said container received in said perforation and both being tapered and the former fitting the walls of the latter, the largest diameter of said container and perforation being at the side of said article adjacent said cover.

5. A package having, in combination, a rectangular cardboard box having a cover, a relatively soft absorbent form-retaining substantially cylindrical edible baked farinaceous article in said box, said article being split in a plane transverse to the axis thereof and having a substantially axially positioned tapered perforation, the largest diameter of said perforation being at the side of said article adjacent said cover, a waterproofed paper container containing an edible filler capable of being absorbed into said article when applied thereto, said container being of frusto-conical shape and being received in said perforation and fitting the walls thereof.

In testimony whereof, I have signed my name to this specification.

WILLIAM A. HEFLER.